Figure 1:
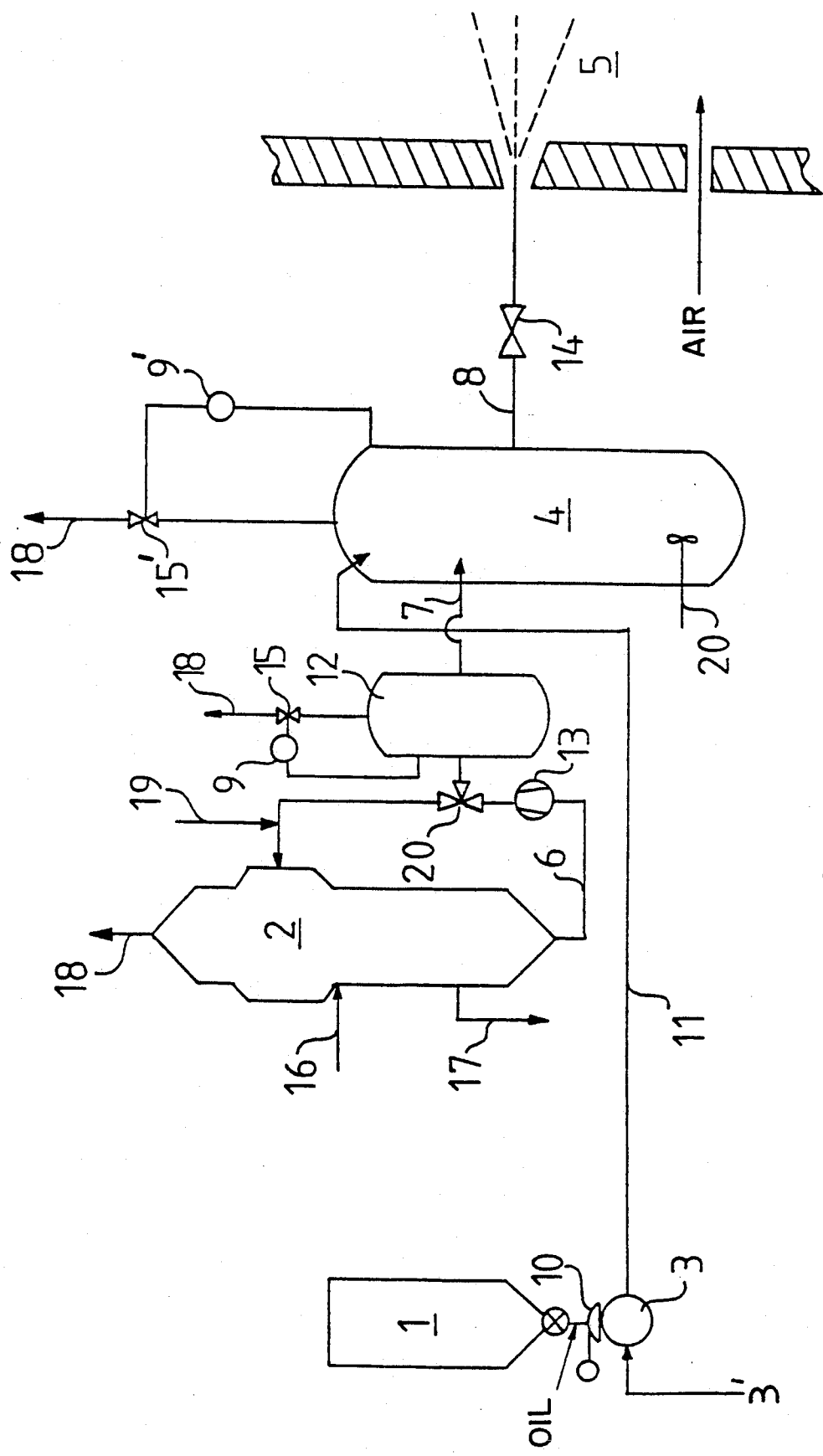

United States Patent
Petänen

[11] Patent Number: 5,230,773
[45] Date of Patent: Jul. 27, 1993

[54] PROCESS FOR THE RECOVERY OF HEAT AND CHEMICALS FROM SPENT LIQUOR

[75] Inventor: Pertti Petänen, Tampere, Finland
[73] Assignee: Oy Tampella AB, Tampere, Finland
[21] Appl. No.: 575,931
[22] Filed: Aug. 31, 1990
[51] Int. Cl.$^5$ .......................... B01D 1/00; B01D 3/06
[52] U.S. Cl. ...................... 159/47.3; 159/2.3; 159/DIG. 34; 159/DIG. 20; 110/238; 110/342; 162/29; 162/30.1; 203/88
[58] Field of Search .......... 159/47.3, 2.1, 2.3, 159/DIG. 34, 46, DIG. 20; 162/29, 30.1, 30.11, 47; 110/219, 238, 341, 342; 122/7 R; 203/88

[56] References Cited

U.S. PATENT DOCUMENTS

| | | | |
|---|---|---|---|
| 1,779,536 | 10/1930 | Goodell | 110/238 |
| 3,862,909 | 1/1975 | Copeland | 159/47.3 |
| 4,312,702 | 1/1982 | Tomlinson | 162/30.11 |
| 4,363,698 | 12/1982 | Nelson et al. | 162/30.1 |
| 4,377,439 | 3/1983 | Liem | 162/30.11 |
| 5,112,441 | 5/1992 | Ruohola et al. | 159/47.3 |

FOREIGN PATENT DOCUMENTS

1283760 5/1991 Canada .
73474 6/1987 Finland .

Primary Examiner—Wilbur Bascomb, Jr.
Attorney, Agent, or Firm—Dressler, Goldsmith, Shore, Sutker & Milnamow, Ltd.

[57] ABSTRACT

The invention relates to a process for the recovery of heat and chemicals from a mixture of ashes and spent liquor by carrying out the final concentrating (2) of the liquor, and its feeding (8) into the soda recovery unit (5), under pressure and at a temperature higher than the atmospheric boiling point of the liquor. According to the invention, the ashes (1) are not mixed with the waste liquor (7) until after the final concentrating (2) of the liquor, and the mixture is further expansion evaporated (4) before the thus concentrated pressurized liquor is fed into the soda recovery unit (5).

7 Claims, 1 Drawing Sheet

PROCESS FOR THE RECOVERY OF HEAT AND CHEMICALS FROM SPENT LIQUOR

The present invention relates to a process for the recovery of heat and chemicals from a mixture of ashes and spent liquor by carrying out the final concentrating of the liquor, and its feeding into the soda recovery unit, under pressure and at a temperature higher than the atmospheric boiling point of the liquor. This invention is an improvement on Finnish Lay-Open Print 73474 and its U.S. counterpart U.S. Pat. No. 5,112,441, all owned by a common assignee.

From Finnish Lay-Open Print 73474 it is known to recover heat and chemicals from spent liquor by evaporating water from it in order to concentrate the liquor and by feeding the concentrated liquor thus obtained, together with air, into the soda recovery unit. In order to raise the solids content to a level higher than normal without at the same time increasing the viscosity of the liquor to an immoderate level, in this process at least the final concentrating of the liquor and its feeding into the soda recovery unit are carried out under pressure and at a temperature higher than the atmospheric boiling point of the liquor. In the process according to FI Lay-Open Print 73474, the ashes are mixed, in an open mixing tank, with the liquor to be concentrated, and the mixture thus obtained is directed to the final concentration.

This prior-art process has the disadvantage that at atmospheric pressure the viscosity of the liquor will rise above the pumpability limit even at a solids content slightly above 70%, and thus it is not possible to mix a very large quantity of ashes with the spent liquor. Furthermore, because the ashes restrict the design of the evaporation plant, they cause problems in the final evaporation. The final evaporator must be washed according to a separate program; a washing effect cannot be achieved by changing the liquor-cycling order. In addition, pipelines from the evaporation plant to the soda recovery unit and back are required. Even small additions of ashes to the spent liquor to be evaporated may cause wear and clogging in the evaporation plant. In addition, the mixing of ashes with the spent liquor before the final concentrating of the liquor will deteriorate the heat economy of the evaporation, since the ashes will soil the thermal surfaces.

The above-mentioned problems could be eliminated by directing the ashes directly into the furnace, but this procedure for its part increases the amount of circulating dust and thereby the dust load.

The object of the present invention is therefore to provide a process for the recovery of heat and chemicals from a mixture of ashes and spent liquor, in which process ashes can be mixed in larger than usual quantities with the spent liquor to be concentrated, without the disadvantages mentioned above. In the process according to the invention, the ashes are thus mixed with spent liquor after the final concentrating of the liquor, the thus obtained mixture of ashes and spent liquor being further expansion evaporated before it is fed into the soda recovery unit, i.e. with the concentrated spent liquor, which is under pressure and has a temperature higher than its atmospheric boiling point, in which case the liquor will still be pumpable in spite of the addition of ashes, even after the expansion evaporation. Through the adding of the ashes to the spent liquor after the final concentrating of the liquor such disadvantages are avoided as would otherwise be caused in the evaporation plant by the adding of ashes to the spent liquor, and through the feeding of the ashes to the concentrated spent liquor at a point before the soda recovery unit, such disadvantages are avoided as would be caused by the adding of dry ashes directly into the soda recovery unit. It was surprising that the mixture of final-concentrated spent liquor and ashes could further be expansion evaporated without exceeding the pumpability limit of the mixture, because when an attempt was made to add ashes to a liquor which had undergone the final concentration and also expansion evaporation, this limit was exceeded and the mixture could no longer be pumped. Instead, when the ashes were, according to the invention, mixed with the final-concentrated liquor, the mixture could surprisingly be further expansion evaporated without problems. In this case the pressure of the mixture is preferably 1-3 bar gauge and its temperature 140°-160° C., i.e. in accordance with the pumping and disintegration temperature of the liquor.

Ashes in the form of a dry dust or a paste can be mixed with the spent liquor. It is possible to use oil for the moistening, and preferably the amount of oil added to the ashes is at maximum about 10 percent of the total weight of the ashes.

The ashes can be mixed with a spent liquor which has been concentrated to a solids content of approx. 70-85% by weight.

From FI Patent 54160 it is known to mix a suitable quantity of solid particles with the material to be treated, in order to render the composition and consistency of the mixture such that it can easily be fed into a fluid-bed reactor so as to become evenly distributed over the entire cross-sectional surface of the reactor. However, the problems encountered in the soda recovery unit are not the same as those in a fluid-bed reactor. According to FI Patent 54160, hot ashes can be mixed with the fuel. However, the purpose is only to recover heat from the hot ashes and thereby to evaporate water from the fuel before its being fed into the reactor.

The invention is described below in greater detail, with reference to the accompanying drawing, which depicts a flow diagram of the apparatus intended for carrying out the process.

In the drawing, the additional concentrator is generally indicated by reference numeral 2. In it the liquor is heated by means of steam, which is directed to the additional concentrator 2 via pipe 16, and the condensate for its part is removed via pipe 17. The concentrator 2 is closed, and evaporation of the liquor in it takes place under pressure, in which case exploitable pressurized steam 18 can be recovered from the upper section of the concentrator, and from the lower section there is pumped a liquor having a solids content of 70-85 percent via pipe 6 by means of a pump 13 and a valve 20, either back to the concentrator 2 or to an expansion tank 12, where an excess pressure is maintained. Fresh spent liquor from pipe 19 is also added to the recycled liquor returning to the concentrator 2.

Ashes from a silo 1 are fed via a bell valve 10 into a pneumatic conveyor 3, into which pressurized air is also fed. The pressurized ashes are further directed via pipe 11 into a pressurized expansion tank 4, which is furthermore equipped with a mixer 20. In the expansion tank 4 the liquor can be concentrated to an even higher solids content while the temperature and pressure of the liquor drop, but not to such a concentration that the viscosity of the liquor would rise to so high a level that the liquor would not be capable of being directed to the soda recovery unit 5 via a pipe 8 equipped with a valve 14. Pressurized steam and air 18 can be recovered from the upper section of the expansion tank 4 and 12, and the pressure in the expansion tank 4 can be regulated by means of a valve 15 and a pressure controller 9.

In the apparatus described the spent liquor is thus evaporated separately in an additional concentrator 2, and the ashes are not mixed with the thus concentrated spent liquor until in the expansion tank 4, the temperature of the liquor in the expansion tank 4 being capable of being adjusted by means of pressure control 9, 15 to the level required by the viscosity (solids content).

The following advantages are thus gained through the use of the process according to the invention:

the evaporation plant can be designed optimally without the necessity of taking into account a recycling of ashes;

pipelines between the evaporation plant and the soda recovery unit are not needed, since the ashes need not be recycled;

no steam problems arise in the mixing;

the temperature and viscosity of the liquor can easily be adjusted to the desired levels.

I claim:

1. A process for the recovery of heat and chemicals from spent liquors consisting essentially of the steps of:
   (a) evaporating water from the liquor in a concentrator vessel to increase the solids concentration by heating under pressure greater than atmospheric to a temperature above the atmospheric boiling point of the liquor;
   (b) feeding the liquor from the concentrator vessel to an expansion vessel where the pressure and temperature are lowered but still maintained above atmospheric pressure and above the atmospheric boiling point of the liquor to further increase the solids concentration of the liquor;
   (c) feeding the liquor from the expansion vessel to a second expansion vessel and mixing the liquor therein with ashes fed into said second expansion vessel under pressure and further expansion evaporating the mixture while still maintaining the mixture above atmospheric pressure and above the atmospheric boiling point of the liquor; and
   (d) feeding the mixture into a soda-ash furnace while maintaining the raised pressure and temperature in the second expansion vessel.

2. A process according to claim 1, characterized in that the mixture of ashes (1) and spent liquor (7) is expansion evaporated (4) at a pressure of 1-3 bar gauge and at 120°-140° C.

3. A process according to claim 1, characterized in that the ashes (1) are pressurized (3) before being mixed with the spent liquor.

4. A process according to claim 3, characterized in that some oil is added to the ashes (1) in order to form a paste before the pressurization (3) of the ashes.

5. A process according to claim 1, 2, 3 or 4, characterized in that ashes (1) and spent liquor (7) having a solids content of approx. 70-85% by weight are mixed with each other.

6. A process according to claim 2, characterized in that the ashes (1) are pressurized (3) before being mixed with the spent liquor.

7. A process according to claim 6, characterized in that some oil is added to the ashes (1) in order to form a paste before the pressurization (3) of the ashes.

* * * * *